Aug. 8, 1950      H. F. BENOIT      2,518,218
COUPLING FOR VACUUM SYSTEMS
Filed May 7, 1947
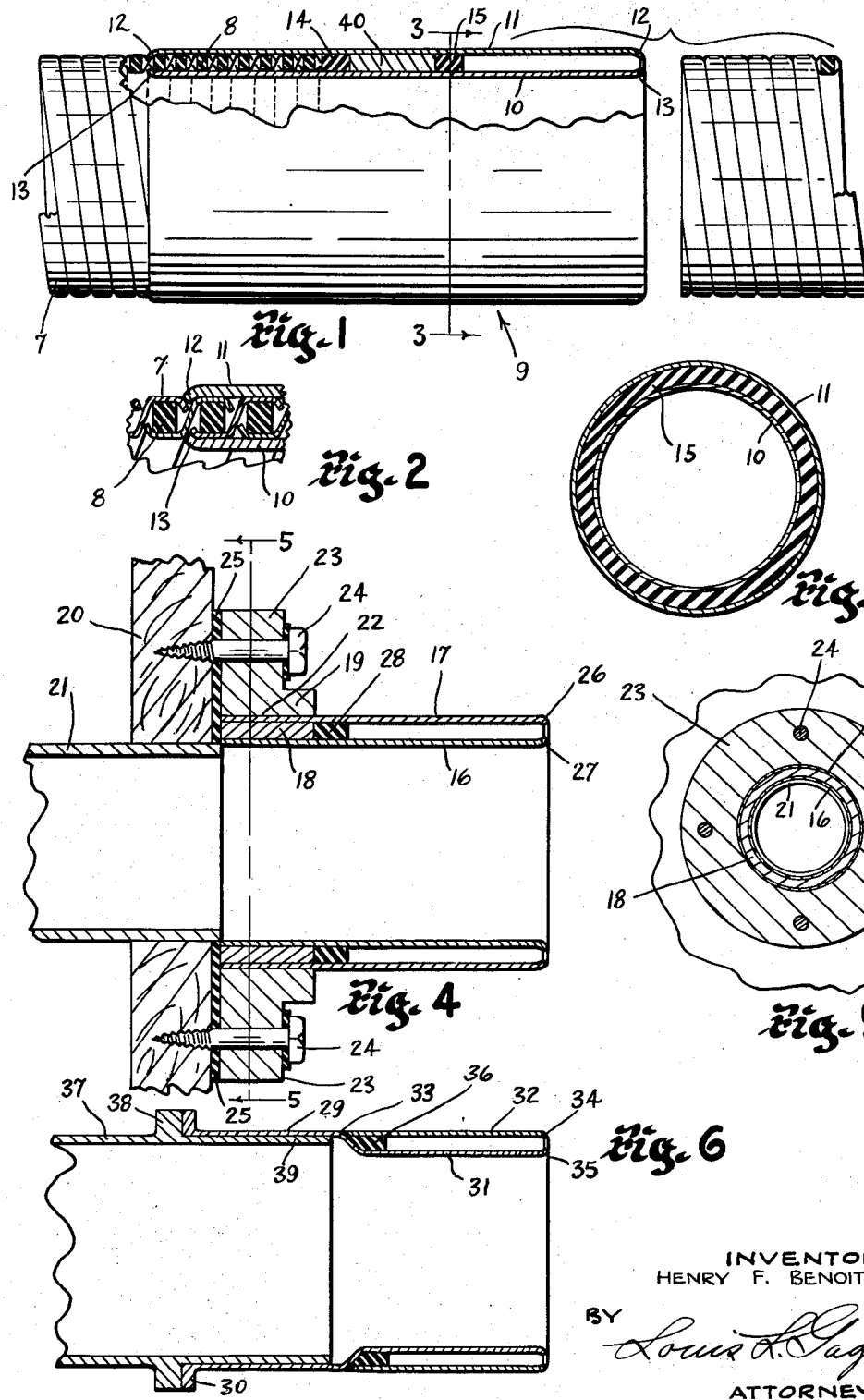
INVENTOR
HENRY F. BENOIT
BY
Louis L. Gagnon
ATTORNEY Patented Aug. 8, 1950

2,518,218

UNITED STATES PATENT OFFICE 2,518,218

COUPLING FOR VACUUM SYSTEMS

Henry F. Benoit, Charlton, Mass.

Application May 7, 1947, Serial No. 746,437

9 Claims. (Cl. 285—25)

This invention relates to vacuum cleaning devices and relates particularly to an improved hose line connection and method of making the same.

One of the principal objects of the invention is to provide a novel hose line connection with various fixtures employed in vacuum systems and method of making the same.

Another object is to provide a hose line connection with various fixtures employed in vacuum systems whereby no separate bonding means is employed for producing said hose line connections with said fixtures and more particularly no heat-joined bonding means such as solder.

Another object is to provide a flexible hose coupling with the various fixtures of a vacuum system wherein the resiliency of the flexible hose is utilized to retain the hose in connected relation with the part to which it is coupled.

Another object is to provide a flexible hose coupling with the various fixtures of a vacuum system wherein the hose construction embodies a portion which may be expanded or compressed and in which this characteristic is employed in retaining the flexible hose in connected relation with the part with which it is coupled.

Another object is to provide a coupling for use with a flexible hose or tubing formed of an endless band and an endless resilient strip spirally wound in inter-relation with each other so that the said resilient strip will permit expansion and contraction of the tubing and the side walls thereof, with said coupling embodying a tubular portion extending within the flexible hose or tubing and a tubular portion fitting over said flexible hose or tubing and so arranged relative to each other as to cause a binding effect to be introduced either on the inside or the outside of said hose or tubing either through compression or expansion of said resilient strip whereby the parts will retain their connected relation with each other.

Another object is to provide means functioning cooperatively with the above for introducing a thread-like connection between the flexible hose or tubing and the fixture to which it is coupled.

Other objects and advantages of the invention will become apparent from the following description taken in connection with the accompanying drawings and it will be apparent that many changes may be made in the details of construction, arrangement of parts and method without departing from the spirit of the invention as expressed in the accompanying claims. I, therefore, do not wish to be limited to the exact details of construction, arrangement of parts and method shown and described as the preferred forms only have been given by way of illustration.

The device embodying the invention relates particularly to forming connections or couplings between a flexible hose line or tubing and a fixture used in vacuum systems whereby the flexible characteristics of the hose line or tubing is utilized in retaining the parts in coupled or connected relation with each other. The device is so designed that the parts may be quickly and easily assembled and yet will retain a permanent binding connection with each other whereby no solder connections are required as has been used with prior art type connections.

Referring to the drawings:

Fig. 1 is a fragmentary side view shown partially in section of one type of coupling connection embodying the invention;

Fig. 2 is an enlarged fragmentary sectional view of a portion of the coupling;

Fig. 3 is a sectional view taken as on the line 3—3 of Fig. 1;

Fig. 4 is a cross-sectional view of a modified form of fixture;

Fig. 5 is a reduced sectional view taken as on line 5—5 of Fig. 4; and

Fig. 6 is a sectional view of a further fixture embodying the invention.

Referring to the drawings wherein like characters of reference designate like parts throughout the various views, the flexible hose line or tubing forming a part of the present invention, as shown best in Figs. 1 and 2, comprises an endless metal band 7 having a substantially S-shaped cross-section spirally wound with its longitudinal edges in overlapping and interfitted relation with each other and so shaped as to encase a spiral continuous band of resilient material 8. The band 8 is preferably formed of rubber, synthetic rubber, or similar resilient material which is adapted to form a seal throughout the length of the spirally wound band with the overlapping and interfitted longitudinal edges of the band functioning cooperatively with the resilient band to lend flexibility to the hose line or tubing whereby the said hose line may be flexed or distorted in any direction for free and unhampered utility thereof. The hose line or tubing, through the resiliency of the endless spirally wound band of resilient material, is such that its diameter may be varied by longitudinal stress imparted on the tubing and is such as to permit the overlapping portions of the spirally wound metallic band to expand or compress relative to each other either under said longitudinal stress or by imparting a compression force on said hose line or tubing. This characteristic of the hose line or tubing is utilized by applicant to accomplish one of the major advantages of his invention.

In Fig. 1, there is illustrated an intermediate coupling 9 for joining two sections of the hose line or tubing. This coupling embodies an inner tubular member 10 and an outer tubular member 11 held in spaced relation with each other by a spacing collar 40. The diameters of the respective tubular members 10 and 11 are controlled in size according to the diameter of the hose line or tubular member described above and according to the thickness of the walls of said hose line, that is, the inner tubular member 10 is preferably formed to a diameter slightly larger than the internal diameter of the hose line and the outer tubular member 11 is preferably formed to a diameter slightly less or smaller than the outside diameter of the hose line with the space between said tubular members 10 and 11 being slightly less than the thickness of the walls of the hose line. This, therefore, requires that the resilient band must be compressed when the end of the hose member is being forced inwardly between the inner and outer tubular members 10 and 11 and this inward forcing of the end of the hose line between the tubular members 10 and 11 is preferably accomplished by rotating the hose line while exerting a force in a direction inwardly of said tubular members. This causes the inner diameter of the tubular member to be slightly expanded and the outer diameter of the tubular member to be slightly contracted thereby compressing the spirally wound resilient material which, when the end of the hose line is properly seated between the tubular members 10 and 11 and the rotation and force is released therefrom, will allow the spirally wound resilient material to tend to return to its initial set thereby causing an expanding force to be exerted on the opposed spirally wound overlapping sections of the metallic band causing them to impart a frictional binding action on the adjacent side surfaces of the tubular members 10 and 11.

When a pulling stress is imparted on the hose line, the diameter thereof will tend to contract and this contracting action will further introduce a binding gripping action on the inner tubular member 10 and will function cooperatively with the expanding of the portions of the inner metallic band lying between said tubular members 10 and 11 to introduce a more positive binding action between said hose line and the tubular members 10 and 11 and more positively hold the parts in connected relation with each other.

To further insure this holding action, the outer ends or opposed edges 12 and 13 of the tubular members 10 and 11 may be spun inwardly toward the flexible hose line or tubing and during the forcing of said hose line inwardly between the tubular members 10 and 11, the spaces between the spirally wound continuous metallic band may be threaded between the converging edges 11 and 12 of said tubular members thereby forming a thread-like connection between said hose line and the respective tubular members 10 and 11. This latter thread-like connection, however, is not essential to applicant's invention and it is optional whether the said tubular members be provided with the inwardly spun edges 12 and 13 or whether the said edges remain parallel with each other. The thread connection, however, will add to the holding function of the coupling but it has been found by applicant that this binding action is not dependent upon this thread-like connection and will function very efficiently without it.

To provide an inner air seal between the adjacent ends of the hose lines and the collar 40, there may be provided washers 14 and 15 of resilient material such as rubber, artificial rubber, leather or other similar material. This latter feature is not essential to obtain a seal, however, for it has been found that the expanding characteristics of the spirally wound resilient material 8 functions, in most instances, to provide an adequate seal.

In Figs. 4 and 5, there is shown a slight modification of applicant's invention wherein the tubular members 16 and 17 corresponding to the tubular members 10 and 11 between which the end of the hose line is forced to connect the same thereto are retained in spaced relation with each other by means of a collar 18 simulating the collar 40 but, in this instance, one end of said tubular members 16 and 17, particularly the ends having the collar 18 therebetween is forced inwardly of a fitting 19 by means of which the hose line may be connected to a wall, ceiling or other permanent support 20 with the tubular members 16 and 17 in alignment with a vacuum line 21 formed in said support. The tubular members 16 and 17 have a press fit with the hollow bore 22 of the fitting 19. Said fitting 19 has a perforated flanged portion 23 through which connecting bolts 24 are extended to connect said fitting with the support 20. To provide a more positive air seal of the fitting 19 with the support 20, there is provided an intermediate flange 25 of resilient material, such as rubber, artificial rubber, leather or other similar material having a sealing effect.

The end of the hose line is adapted to be fitted between the tubular members 16 and 17 as previously described above in connection with the showing of Fig. 1. The ends 26 and 27 of the said tubular members 16 and 17 may be spun inwardly toward each other in a manner simulating the ends 12 and 13 to perform the same function.

Inwardly adjacent the collar 18, there may or may not be provided a resilient washer 28 as desired for providing a more positive air seal with the end of the hose line.

In Fig. 6, there is shown a nozzle coupling which comprises a tubular member 29 having a flange 30 adjacent one end thereof and a reduced tubular-like portion 31 adjacent its opposed end. The tubular-like portion 31 functions in a manner similar to the tube 10 or 16 set forth above. A second tubular member 32 simulating the tubular members 11 and 17 is secured to the tubular portion 29 in spaced relation with the portion 31. The said tubular member 32 is secured to the tubular member 29 as by brazing or the like as illustrated at 33. The outer ends 34 and 35 may be swung inwardly toward each other in a manner similar to the ends 12 and 13 and to perform the same function. Inwardly of the spaced tubular portions 31 and 32, there may be provided a washer of rubber or similar resilient material to function as an air seal and similar to the washers 14 and 15. The nozzle 37 is of the conventional type having a flange portion 38 adapted to seat with the flange 30 and to have a portion 39 adapted to extend within the portion 29 and to be held therein by the force of the vacuum suction. It is to be understood that the end of the flexible hose line or tubing is to be secured between the tubular portions 31 and 32 in a manner similar to that described in connection with Fig. 1.

The hose line described herein is used in textile mills for removing lint from the various fabricating machines and are in continuous daily use and subjected to considerable strain and wear.

It has been usual with known prior art systems of this nature to secure such flexible hose lines or tubings to their fixtures by soldering the ends thereof to the various fittings. This soldering naturally required a temperature sufficiently high to melt the solder and to cause the solder to properly and permanently secure the parts in connected relation with each other.

It has been found by applicant that this prior art soldering operation, particularly the heat required thereby, would cause the spirally wound rubber band, at the location of the solder connection, to be injured by the heat either by blistering or burning and thereby caused it to relatively quickly deteriorate and to lose its sealing function. This heat also tended to soften the metal of the spiral windings and to cause it also to fail to perform the full extent of its normal usefulness.

Such prior art couplings or connections have been the source of considerable trouble in the past and with applicant's arrangement, as disclosed herein, all of these prior art difficulties have been overcome.

With applicant's device, all that is required is to carefully control the dimensional characteristics of the spaced concentrically arranged tubings, such as shown at 10 and 11, 16 and 17, and 31 and 32 of Figs. 1, 4 and 6 in a manner such as has been described in connection with Fig. 1. The end of the hose line or tubing which is to be connected with the fitting is then merely placed inwardly between the concentric tubings and is forced therein by rotating the said tubular member with a motion simulating a threading motion imparted in the direction of the windings of the spiral metallic band whereupon the said tubular member will move inwardly between the tubular members 10 and 11 with relative ease and will become permanently secured therein through the expanding or contracting action of the resilient band 8.

It is pointed out that the connection utilizes, at least in part, the resiliency of the flexible hose or tubing to bind on either the inside or outside tubular member 10 and 11. If the hose line or tubular member is rotated in the direction opposite that of the spiral windings, the internal diameter of the hose line will tend to decrease and thereby cause a binding action to take place on the inner tubular member 10. If, however, the hose line or tubing is turned in the opposite direction, the diameter will have a tendency to expand and will cause a binding action to take place on the inner surface of the outer tubular member 11. The former is particularly true when the end of the hose line or tubing is in engagement with the resilient washer 14 and 15 as the case may be or the side surface of the collar 40 thereby limiting its movement in a direction inwardly between said tubular members 10 and 11.

Although the spiral continuous band has been described above as being preferably formed of rubber, synthetic rubber or other similar material, the said band may be formed of asbestos, cotton cord or yarn or any other material having some measure of resiliency.

Rubber or similar material is preferable because of its non-porous, more positive sealing effect. In instances when porous materials are used, they are sufficiently compacted and compressed between the overlapping longitudinal edges of the metallic strip 7 so as to afford an adequate air seal. In some instances, it might be preferable to pretreat the said porous material to render the same non-porous.

In the latter instance, the band 7 is preferably formed of material having a resilient and springy nature which, when the inner and outer surfaces of the bands are compressed between the concentric tubular portions, for example, 10 and 11, they will have sufficient give so as to yield to said compression and will tend to return to their initial set and thereby function cooperatively with the band 8 to bring about the binding coupling connection. A thin band of relatively thin spring steel shaped to the S cross-sectional shape is preferable and may be provided with a non-corrosive coating such as chromium, nickel or the like.

It is further pointed out that although applicant's device has been disclosed as being preferably used in vacuum systems, similar hose lines and couplings with fixtures in any air line for example, pressure air line systems, may be used.

In instances when the band 7 is formed of resilient springy material such as set forth above and when the side walls of the hose line is compressed or forced under compression inwardly between the tubular members as for example, 10 and 11, there will be a tendency of the intermediate section between the overlapping longitudinal edges to yield under said compression and with the S-shaped cross-section tending to move towards the direction of flattening and thereby causing the said overlapping longitudinal edges to have a frictional binding effect with the adjacent inner and outer surfaces of the tubular members and thereby introduce a frictional seal therewith. It is to be understood, of course, that the continuous band 8 aids in accomplishing this result.

From the foregoing description, it will be seen that simple, efficient and economical means and method have been provided for accomplishing all of the objects and advantages of the invention.

Having described my invention, I claim:

1. A device of the character described comprising a flexible hose line embodying spaced collapsible wall portions having a compressible and expandable resilient band therebetween and a fixture embodying spaced substantially concentric tubular portions coupled with said hose line, with one end of said hose line lying between said spaced tubular portions, said inner tubular portion having a smooth outer surface and being of a diameter slightly greater than the inner diameter of the hose line, said outer tubular portion having an inner smooth surface and being of a diameter slightly less than the outer diameter of the hose line and the space between said substantially concentric tubular portions being fixed and slightly less than the normal distance between the outer and inner surfaces of the spaced collapsible wall portions of the hose line, whereby the resilient band between the spaced wall portions is compressed and the tendency thereof to return to its initial set will cause the inner and outer surfaces of the spaced wall portions of the hose line to have a friction binding with the adjacent surfaces of the inner and outer tubular portions.

2. A device of the character described comprising a flexible hose line embodying spaced wall portions supported for movement toward and away from each other having a compressible and expandable resilient band therebetween and a fixture embodying spaced substantially concentric tubular portions coupled with said hose line, with one end of said hose line lying between said spaced tubular portions, said inner tubular portion having a smooth outer surface and being of a diameter slightly greater than the inner diameter of the hose line, said outer tubular portion having an inner smooth surface and being of a diameter slightly less than the outer diameter of the hose line and the space between said substantially concentric tubular portions being fixed and slightly less than the normal distance between the outer and inner surfaces of the spaced wall portions of the hose line, whereby the resilient band between the spaced wall portions is compressed and the tendency thereof to return to its initial set will cause the inner and outer surfaces of the spaced wall portions of the hose line to have a friction binding with the adjacent surfaces of the inner and outer tubular portions, said spaced tubular portions having a resilient washer therebetween and in engagement with the inner end of the hose line.

3. A device of the character described comprising a flexible hose line embodying spaced metallic wall portions supported so as to be movable toward and away from each other having a band of resilient compressible and expandable material therebetween and a fixture embodying spaced substantially concentric tubular portions coupled with said hose line, with one end of said hose line lying between said spaced tubular portions, said inner tubular portion having a smooth outer surface and being of a diameter slightly greater than the inner diameter of the hose line, said outer tubular portion having an inner smooth surface and being of a diameter slightly less than the outer diameter of the hose line and the space between said substantially concentric tubular portions being fixed and slightly less than the normal distance between the outer and inner surfaces of the spaced wall portions of the hose line, whereby the resilient band between the spaced wall portions is compressed and the tendency thereof to return to its initial set will cause the inner and outer surfaces of the spaced wall portions of the hose line to have a friction binding with the adjacent surfaces of the inner and outer tubular portions.

4. A device of the character described comprising a flexible hose line embodying spaced metallic wall portions having a band of resilient compressible and expandable material therebetween and a fixture embodying spaced substantially concentric tubular portions coupled with said hose line, with one end of said hose line lying between said spaced tubular portions, said inner tubular portion having a smooth outer surface and being of a diameter slightly greater than the inner diameter of the hose line, said outer tubular portion having an inner smooth surface and being of a diameter slightly less than the outer diameter of the hose line and the space between said substantially concentric tubular portions being fixed and slightly less than the normal distance between the outer and inner surfaces of the spaced wall portions of the hose line, whereby the resilient band between the spaced wall portions is compressed and the tendency thereof to return to its initial set will cause the inner and outer surfaces of the spaced wall portions of the hose line to have a friction binding with the adjacent surfaces of the inner and outer tubular portions, said spaced tubular portions having a resilient washer therebetween and in engagement with the inner end of the hose line.

5. A device of the character described comprising a flexible hose line embodying spirally wound bands having overlapping spaced wall portions having a spirally wound band of resilient compressible and expandable material therebetween and a fixture embodying spaced substantially concentric tubular portions coupled with said hose line, with one end of said hose line lying between said spaced tubular portions, said inner tubular portion having a smooth outer surface and being of a diameter slightly greater than the inner diameter of the hose line, said outer tubular portion having an inner smooth surface and diameter slightly less than the outer diameter of the hose line and the space between said substantially concentric tubular portions being fixed and slightly less than the normal distance between the outer and inner surfaces of the spaced wall portions of the hose line, whereby the resilient band between the spaced wall portions is compressed and the tendency thereof to return to its initial set will cause the inner and outer surfaces of the spaced wall portions of the hose line to have a friction binding with the adjacent surfaces of the inner and outer tubular portions.

6. A device of the character described comprising a flexible hose line embodying spirally wound bands of a metallic material having overlapping spaced wall portions having a spirally wound band of resilient compressible and expandable material therebetween and a fixture embodying spaced substantially concentric tubular portions coupled with said hose line, with one end of said hose line lying between said spaced tubular portions, said inner tubular portion having a smooth outer surface and being of a diameter slightly greater than the inner diameter of the hose line, said outer tubular portion having an inner smooth surface and being of a diameter slightly less than the outer diameter of the hose line and the space between said substantially concentric tubular portions being slightly less than the normal distance between the outer and inner surfaces of the spaced wall portions of the hose line, whereby the resilient band between the spaced wall portions is compressed and the tendency thereof to return to its initial set will cause the inner and outer surfaces of the spaced wall portions of the hose line to have a friction binding with the adjacent surfaces of the inner and outer tubular portions, the outer ends of the tubular portions having inturned edge portions threadedly related with the spirally wound wall portions.

7. A device of the character described comprising a flexible hose line embodying spirally wound bands of solid material having overlapping spaced wall portions movable toward and away from each other having a spirally wound band of resilient expandable and compressible material therebetween and a fixture embodying spaced substantially concentric tubular portions coupled with said hose line, with one end of said hose line lying between said spaced tubular portions, said inner tubular portion having a smooth outer surface and being of a diameter slightly greater than the inner diameter of the hose line, said outer tubular portion having an inner smooth surface and being of a diameter slightly less than the outer diameter of the hose line and the space between said substantially concentric tubular portions being fixed and slightly less than the normal distance between the outer and inner surfaces of the spaced wall portions of the hose line, whereby the resilient band between the spaced wall portions is compressed and the tendency thereof to return to its initial set will cause the inner and outer surfaces of the spaced wall portions of the hose line to have a friction binding with the adjacent surfaces of the inner and outer tubular portions, the outer ends of the tubular portions having inturned edge portions threadedly related with the spirally wound wall portions, said spaced tubular portions having a resilient washer therebetween and in engagement with the inner end of the hose line.

8. A device of the character described comprising a flexible hose line embodying spaced wall portions movable toward each other having a band of resilient compressible and expandable material therebetween and a fixture embodying spaced tubular portions having at least one of their ends held in substantially fixed concentric relation with each other by a spacer member lying therebetween and located at a given distance from said ends, said inner tubular portion having a smooth outer surface and being of a diameter slightly greater than the inner diameter of the hose line, said outer tubular portion having an inner smooth surface and being of a diameter slightly less than the outer diameter of the hose line and the space between said substantially concentric tubular portions being fixed and slightly less than the normal distance between the outer and inner surfaces of the spaced wall portions of the hose line, whereby the spaced walls are moved toward each other and the resilient band between the spaced wall portions is compressed and the tendency thereof to return to its initial set will cause the inner and outer surfaces of the spaced wall portions of the hose line to have a friction binding with the adjacent surfaces of the inner and outer tubular portions.

9. A device of the character described comprising a hose line embodying spaced wall portions of relatively solid material movable toward and away from each other having a band of flexible material therebetween and a fixture embodying spaced substantially parallel and concentric tubular portions coupled with said hose line, said inner tubular portion having a smooth outer surface and being of a diameter slightly greater than the inner diameter of the hose line, said outer tubular portion having an inner smooth surface being of a diameter slightly less than the outer diameter of the hose line and the space between said substantially concentric tubular portions being fixed and slightly less than the normal distance between the outer and inner surfaces of the spaced wall portions of the hose line.

HENRY F. BENOIT.

REFERENCES CITED

The following references are of record in the file of this patent:

UNITED STATES PATENTS

| Number | Name | Date |
| --- | --- | --- |
| 1,160,944 | Muller | Nov. 16, 1915 |
| 1,272,714 | Reinhalter | July 16, 1918 |
| 1,368,985 | Storie | Feb. 15, 1921 |
| 1,861,403 | Wallace | May 3, 1932 |
| 1,913,198 | Geyer | June 6, 1933 |
| 1,969,203 | Gadden et al. | Aug. 7, 1934 |
| 2,019,540 | Mascuch | Nov. 5, 1935 |
| 2,052,448 | Golaert | Aug. 25, 1936 |
| 2,138,946 | Trickey | Dec. 6, 1938 |
| 2,252,299 | McCoy | Aug. 12, 1941 |
| 2,360,159 | Peck | Oct. 10, 1944 |